United States Patent [19]

Hayes et al.

[11] Patent Number: 5,482,747
[45] Date of Patent: Jan. 9, 1996

[54] POLY(VINYL ALCOHOL) POLYMER BLEND TEXTILE SIZES WITH IMPROVED ABILITY TO BE DESIZED

[75] Inventors: Richard A. Hayes, Wilmington, Del.; George D. Robinson, Matthews, N.C.

[73] Assignee: E. I. Du Pont de Nemours and Company, Wilmington, Del.

[21] Appl. No.: 444,591

[22] Filed: May 19, 1995

Related U.S. Application Data

[62] Division of Ser. No. 202,620, Feb. 28, 1994, Pat. No. 5,436,293.

[51] Int. Cl.$^6$ .............................. B05D 3/02; B05D 3/04; B05D 3/10
[52] U.S. Cl. .................. 427/341; 427/342; 427/353; 427/389.9; 427/401
[58] Field of Search .................... 427/341, 342, 427/353, 389.9, 401; 525/57, 56, 227

[56] References Cited

U.S. PATENT DOCUMENTS

| | | | |
|---|---|---|---|
| 3,689,469 | 9/1972 | Inskip et al. | 260/86.1 |
| 4,013,805 | 3/1977 | Corey et al. | 427/390 |
| 4,043,961 | 8/1977 | Beresniewicz et al. | 428/500 X |
| 4,073,994 | 2/1978 | Baatz et al. | 428/265 |
| 4,172,930 | 10/1979 | Kajitani et al. | 525/56 |
| 4,640,946 | 2/1987 | Vassallo et al. | 524/45 |
| 4,990,335 | 2/1991 | Bateman et al. | 424/408 |

FOREIGN PATENT DOCUMENTS 50-32335  10/1975  Japan .

OTHER PUBLICATIONS

Polyvinyl Alcohol Properties and Applications; Chapter 11, pp. 365–368, No date.

*Primary Examiner*—Michael Lusignan
*Attorney, Agent, or Firm*—Peter A. Fowell

[57] ABSTRACT

Compositions based on blends of certain specified poly(vinyl alcohol) copolymers and other poly(vinyl alcohol) polymers are described which are useful as sizes, and have improved ability to be desized from fabrics compared with the other poly(vinyl alcohol) polymers alone. The specific poly(vinyl alcohol) copolymers useful in the blends with other poly(vinyl alcohol) polymers are copolymers having a high level of acrylic ester comonomer. The blend sizes are useful in producing woven materials since they are excellent sizes, and are uniquely adaptable to caustic desizing.

4 Claims, No Drawings

POLY(VINYL ALCOHOL) POLYMER BLEND TEXTILE SIZES WITH IMPROVED ABILITY TO BE DESIZED

CROSS REFERENCE TO RELATED APPLICATION

This application is a division of application, Ser. No. 08/202,620, filed Feb. 28, 1994, now U.S. Pat. No. 5,436,293, patented Jul. 25, 1995.

BACKGROUND OF THE INVENTION

1. Field of the Invention

This invention relates to compositions useful for textile sizes, based on blends of particular poly(vinyl alcohol) copolymers with other poly(vinyl alcohol) polymers, and to the process of weaving textile fabrics which employs the compositions as sizes and utilizes their ready ability to be desized. The sizes are based on copolymers having a high level of acrylic ester comonomer, blended with other poly(vinyl alcohol) polymers. Desizing involves use of caustic solutions and is ideally suited to such compositions.

2. Background of the Invention

Poly(vinyl alcohol) homopolymers, and certain poly(vinyl alcohol) copolymers have been known for use as textile sizes for many years. For convenience, both will be generically referred to hereinafter as PVA(s) or PVA polymers. When specificity requires they will be referred to as PVA homopolymers or homopolymer PVA and PVA copolymers or copolymer PVA. By convention, homopolymer PVA includes PVA derived from homopolymer poly(vinyl acetate) which has been only partially hydrolysed as well as that which has been 'fully' (>98%) hydrolysed. The terms 'fully hydrolysed PVA homopolymer' and 'partially hydrolysed PVA homopolymer' will be used when distinction is necessary. It is also possible to have fully or partially hydrolysed PVA copolymers though most copolymers are fully hydrolysed.

These different PVAs differ quite significantly in properties as textile sizes and in the ability of fabrics sized with them to be desized. This difference primarily depends on the degree of hydrolysis and the comonomer content, but also on other factors including molecular weight and thermal history.

PVAs are commonly prepared by alcoholysis of the corresponding poly(vinyl acetate) homopolymer or copolymer. The process is often (though not strictly correctly) referred to as hydrolysis; hence the term 'partially hydrolyzed' when not all the acetate groups are completely converted to alcohol groups. When homopolymer poly(vinyl acetate) is only partially hydrolysed, the resulting PVA is really a vinyl alcohol/vinyl acetate copolymer. However, as noted, such polymers are generally referred to as PVA homopolymers. The term copolymer in this regard is reserved for materials which result from hydrolysis of the corresponding vinyl acetate copolymer, i.e. polymer also containing units derived from a monomer other than vinyl acetate.

Fully hydrolysed PVA homopolymer is highly crystalline, and strong, but because of its high crystallinity it dissolves only in hot, not cold water. Furthermore, when it is subjected to high temperatures, it can develop even higher levels of crystallinity than as prepared, resulting in polymer which is even more difficult to dissolve. Finishing mills with certain fabrics, particularly blend fabrics, tend to use a heat setting condition to relieve fiber stress. The treatment is typically carried out at temperatures which develop further crystallinity in fully hydrolysed PVA homopolymer, so that when such polymer is used as size on fabric, the treatment causes an increase in its crystallinity and a decrease in ease of subsequent desizing.

PVA copolymers and partially hydrolysed PVA homopolymers are less crystalline, and dissolve at lower temperatures, or more rapidly at a given temperature. As a result they desize in water more readily, and are less subject to change in crystallinity and ability to be desized with fabric heat-setting treatments. For a given level of comonomer or residual unhydrolyzed acetate units however, the two types of PVAs are not identical in several respects. This is partly because the distribution of comonomer units (or units derived from them by lactonization, as discussed below) along the polymer chain is not the same as the distribution of residual acetate units along the chain after partial hydrolysis. One difference, for instance, is that acetate units tend to be blocky, and blockiness of partially hydrolysed PVA causes more surfactant behavior and more foaming when used as size.

Various PVA copolymers have been disclosed as being useful for textile sizes. U.S. Pat. No. 3,689,469 (Inskip et al.) discloses PVA copolymers with 2 to 6.5 weight percent methyl methacrylate as comonomer which are useful as textile sizes, and compares their properties as sizes with fully hydrolysed and partially hydrolysed PVA homopolymer. The disclosure also indicates however, that above about 6 weight percent methyl methacrylate such copolymers are excessively water soluble.

PVA copolymers containing 1 to 10 mole percent methyl acrylate or methyl methacrylate as comonomer are disclosed in U.S. Pat. No. 4,990,335 (Bateman et al.). (For methyl acrylate this corresponds to about 2 to 16 weight percent methyl acrylate in the polymer, calculated as non-lactonized vinyl alcohol copolymer). The polymers are disclosed as being useful for certain tableting applications. There is no suggestion for use of such polymers as a textile size.

Japanese Patent No. 75-32355 discloses modified poly(vinyl alcohol) polymer fiber sizing agents containing 0.1 to 15 mole % lactone rings. In an example, cotton fabric sized with a 4.7 mole % lactone polymer prepared by saponifying (hydrolyzing) a poly(vinyl acetate/methyl acrylate) copolymer with 4.5% methyl acrylate (which corresponds to 4.7 mole % lactone when the comonomer is fully lactonized, and to about 8.1 weight percent methyl acrylate calculated as non-lactonized vinyl alcohol copolymer) had better scouring fastness than homopolymer PVA.

Desizing usually involves water washing. However desizing of particular polymers with caustic solution is sometimes used and has been described. U.S. Pat. No. 4,013,805 (Corey et al.) discloses a poly(vinyl acetate) copolymer which contains a comonomer with free carboxylic acid groups derived from a monomer such as acrylic acid, which can be desized with aqueous base. The poly(vinyl acetate) copolymer is not hydrolysed to the corresponding poly(vinyl alcohol) copolymer.

Desizing of wax-free PVA polymer or copolymer sizes, where the copolymer may contain up to 6 weight percent methyl methacrylate or other comonomers, and wherein the size contains an alcohol ethoxylate surfactant, using an alkaline scour bath followed by hot water rinses, is disclosed as being easy compared with comparable sizes with wax but no surfactant, in U.S. Pat. No. 4,640,946 (Vassallo et al.).

U.S. Pat. No. 4,172,930 (Kajitani et al.) discloses a PVA copolymer as textile size where the comonomer is 0.1–10 mole percent of a diacid such as maleic and fumaric acids, but having no monoester, diester or anhydride of the diacid. Copolymers containing free acid can be extremely water sensitive.

Solubility and dissolution times of various types of PVA in water and caustic solutions are discussed in 'Polyvinyl Alcohol', John Wiley & Sons Ltd., 1992, Chapter 11, p365–368. It is noted there that partially hydrolysed PVA homopolymer dissolves more slowly in caustic solutions than in water, whereas PVA copolymers with methyl methacrylate as comonomer dissolve more rapidly in caustic than in water. This is explained by the fact that caustic further hydrolyses partially hydrolysed PVA to homopolymer, whereas with the copolymer, lactone rings known to be present are saponified, resulting in ionic groups which are highly soluble. The methyl methacrylate copolymers discussed were designated T-25 and T-66. The amounts of methyl methacryate in those copolymers were not disclosed. Those polymers are manufactured by E. I. du Pont de Nemours & Co. They both contain less than 6.5 weight percent methyl methacrylate, calculated on the basis of non-lactonized poly(vinyl alcohol) copolymer.

The whole chapter in the above reference provides a general background to use of PVA copolymers and other materials in sizing applications.

Many other materials are known for use as textile sizes. Unmodified starches are inexpensive, but they do not generally have as good properties as PVAs, often flaking off the yarn when used as sizes. They do not give stable solutions, and often desizing requires use of enzymes. Many modified starches are known which are improvements in various ways over simple starches, but may be considerably more expensive. Polyacrylic sizes are also known and have good properties, but are extremely water sensitive. Known PVA based sizes may be considered to have, very generally, sizing utility intermediate between starches and polyacrylic sizes, more specifically with respect to their ability to be desized. In their sizing quality, and their effect in the weaving part of material production, they are, perhaps, generally superior to starches and acrylic sizes.

Blending different sizing materials is known and used. Blending can provide properties of the size itself, and economics, intermediate between those of the components. Heretofore however, PVA copolymers containing above 6.5 weight percent ester comonomer have not been considered as components of blend sizes. Nor has blending as a means of enhancing ability to be desized heretofore been considered.

Ease of desizing can strongly affect the economics of the post-weaving processes involved in overall fabric production. While many sizing materials are known, each having its particular niche, there remains a need for size materials which are very readily desized, particularly so that they allow higher production rates or lower temperatures, and which have acceptable mechanical properties, and give stable size solutions, yet which have acceptable water insensitivity. There also remains a need for a size material which can be used to upgrade various size properties, but particularly to upgrade the ability to be desized, by utilization of such a material in blends with known PVA size materials.

SUMMARY OF INVENTION

The invention concerns improved sizing compositions which are blends of PVA copolymers containing a very high level of an ester comonomer and other PVA size materials. The blends are effective sizes. They are used as aqueous solutions. Fabrics sized with these blends are able to be very effectively desized compared with the other size materials alone.

More particularly, the present invention provides a sizing composition which is an aqueous solution of a blend poly(vinyl alcohol) polymers, comprising;

a) from 10 to 90 parts of a first poly(vinyl alcohol) polymer which is a poly(vinyl alcohol) copolymer containing from about 7 to 15 weight percent units derived from an alkyl acrylate or methacrylate or a dialkyl fumarate or maleate, wherein the alkyl group contains from 1 to 8 carbon atom, and b) from 90 to 10 parts of a second poly(vinyl alcohol) polymer which is a poly(vinyl alcohol) homopolymer, or a poly(vinyl alcohol) copolymer containing less than 7 weight percent units derived from an alkyl acrylate or methacrylate, or dialkyl fumarate or maleate, wherein the alkyl group contains from 1 to 8 carbon atoms, or blend of such second poly(vinyl alcohol) polymers.

The invention further provides a process to produce woven textile materials where yarn is sized with the above blended size materials, and after weaving, the size is removed from the woven textile fabric with a dilute caustic solution, and optionally, the caustic desized fabric is further washed with water.

DETAILED DESCRIPTION OF THE INVENTION

In this disclosure, it should be understood that the use of the term comonomer, when referring to PVA copolymers, as used here and as conventionally used, refers to the comonomer copolymerized in the poly(vinyl acetate) copolymer before the latter is converted to a PVA by alcoholysis. In PVA copolymers, ester comonomer units are subject to reactions with a hydroxyl from an adjacent vinyl alcohol unit to form lactones, and free alcohol from the ester unit. Thus the original ester monomer unit may no longer exist as the same entity as was present in the precursor poly(vinyl acetate) copolymer. Almost complete lactonization may occur, though the extent may vary with different comonomers. The use of phrases such as PVA copolymers 'with' or 'containing' a given comonomer and the like should be understood in this context.

PVA copolymers containing up to 15 mole % lactone rings have been disclosed generally as sizing materials. Commercially, PVA copolymers containing up to about 5 weight percent methyl methacrylate have actually been used for textile size compositions. About 6 weight percent methyl methacrylate has been considered the useful upper limit, since, as noted above, higher levels were considered to make the polymers highly water sensitive.

Surprisingly, PVA copolymers with comonomer levels even above 7 weight percent of certain acrylate, methacrylate and certain other comonomers are suitable as textile sizes. This is because they have a major advantage over previous sizing compositions in that they have now been found to be particularly easy to desize if, instead of the usual water as desizer, dilute caustic solutions are used. In addition, presumably because such copolymers have low crystallinity and crystallize less readily, the ability to desize using caustic solutions is far less affected by heat treatment than for copolymers containing less ester comonomer.

The chemical nature and solubility characteristics in water and caustic solutions of PVA copolymers containing an ester comonomer has been recognized in a general qualitative way. Heretofore however, it had not been recognized that a major divergence in solubility characteristics between water and caustic solubility occurs when high ester comonomer levels are present, i.e., above about 6%). More importantly, it had not been recognized that such a divergence presents an ideal situation for utilization of such copolymers as sizes, either alone, but particularly in blends with other size materials, because such copolymers are amenable to easy desizing using caustic solutions.

Sizes based on blends of such high ester PVA copolymers with most PVA polymers previously used as size materials are more readily desized than such PVA polymers alone. Utilization of these high ester PVA copolymers alone is the subject of a copending patent application.

In general, PVA copolymers have good mechanical properties as sizes. When in addition, the desizing advantage of high ester comonomer copolymers is taken into account, they have a place as size materials and as blending materials to aid in desizing. Thus they are also useful as sizes when blended with other PVA polymer size materials or when blended with starches. They can contribute both to the properties of the blend size and to the overall ease of desizing provided caustic desizing is used. In blend compositions tested, it has been found that the ease of desizing with caustic solutions is, very approximately, a weighted average of the ability to desize the blend components, rather than being limited by the least readily desized component. This means that if a particular quality of a size material is desired—a particular property, or low cost for instance—in a size material that is difficult to desize, then a blend with high ester comonomer containing PVA copolymer may offer an ideal compromise between properties and ability to desize.

PVA copolymers with acrylate and methacrylate comonomers can be prepared by well known methods which involve preparation of the corresponding poly(vinyl acetate) copolymer, followed by saponification, alcoholysis or 'hydrolysis'. Typical preparation of such poly(vinyl acetate) copolymers and their hydrolysis is given in U.S. Pat. No. 3,689,469 which describes laboratory scale preparations, and U.S. Pat. No. 4,900,335 which describes a continuous process for such polymerizations, and particularly for high ester containing PVA copolymers. The amounts of monomer are adjusted for different levels required in the polymer, and for their different reactivities. These two patents are hereby incorporated by reference.

Methacrylates are more reactive than acrylates, but both are far more reactive than vinyl acetate, so that typically they are completely reacted, while less reactive vinyl acetate has to be stripped off, and would be recycled in a commercial continuous process. Dialkyl maleates are considerably less reactive.

Suitable comonomers in the high ester comonomer PVA copolymers useful as blend copolymers in this invention are esters of unsaturated monocarboxylic acids and diesters of unsaturated dicarboxylic acids. Free carboxylic acid should not be present in the copolymers. Examples include alkyl acrylates, methacrylates, dialkyl fumarates and maleates having an alkyl group or groups containing 1 to 8 carbon atoms. Comonomer level can be from 7 to 15 weight percent calculated on the basis of non-lactonized poly(vinyl alcohol/ ester) copolymers. As noted, after alcoholysis, during neutralization of the alkaline catalyst with acid, the comonomer ester group and adjacent vinyl alcohol hyroxyl groups are believed to be largely converted to lactone rings, with release of the ester alcohol. There is thus a loss of weight due to the loss of ester alcohol, but the units which are not vinyl alcohol units are lactone units, and will comprise a higher weight percent of the polymer than that of the comonomer, since an adjacent alcohol unit is involved in the lactone unit, which then has two chain carbon atoms.

To obtain above 15 weight percent ester in the poly(vinyl alcohol) copolymer, calculated on a non-lactonized basis, requires a poly(vinyl acetate) copolymer precursor which is difficult to prepare. Alkyl acrylates are preferred, and methyl acrylate is most preferred. While the decreased level of crystallinity resulting from increased comonomer levels has, in the past, been assumed to cause very high water sensitivity, (i.e. tendency to absorb water and become sticky, which can result in decreased weaving efficiency), this is not necessarily the case. Thus, very surprisingly, it was found that a copolymer containing 9 weight percent methyl acrylate was actually less water sensitive, (dissolved less rapidly, as determined by ease of water desizing), than that a ~5.5 weight percent methyl methacryate PVA copolymer or an 88% partially hydrolysed PVA homopolymer. While not limiting ourselves to any particular theory, it is thought that methyl acrylate or other acrylates as comonomer will decrease crystallinity in the resulting copolymer less than methyl methacrylate or other methacrylates do, even if the comonomer unit becomes lactonized, because of the lack of a methyl group attached to an in-chain carbon which methyl methacrylate produces when polymerized. Alternatively, differences in the amount of lactonization may be responsible.

Different comonomers will result in varying levels of water sensitivity in the resulting copolymer. The sensitivity will depend on the reduction in crystallinity due to increasing number of comonomer units (or derived lactone units), but will also depend on the net decrease in polarity with increasing comonomer level. While long alkyl chain alkyl acrylates and methacrylates are less polar than short alkyl chain ones, PVA copolymers of long chain acrylates and methacrylates, on lactonization may contain the same in-chain lactone group as that from any other acrylate or methacrylate copolymer respectively. However, methacrylate derived lactone rings will not be the same as acrylate derived lactone rings. In addition, the amount of lactonization may vary. In any event, any copolymer can be expected to have a water sensitivity which is a balance due to the amount of reduction in crystallinity the comonomer or derived lactone causes, and the overall decreased polarity of the copolymer with increasing comonomer or derived lactone content. All the ester comonomers and the lactone ring they can form, will be less polar and hence less water sensitive than vinyl alcohol units.

While methacrylate comonomer PVA copolymers are less favored, even here, as the comonomer level is increased significantly, decreased polarity in the copolymer will result. At very high comonomer levels, decreasing polarity will eventually override the increasing water sensitivity which results from decreasing crystallinity. The major advantage of ready desizing at high ester comonomer levels can make high comonomer level methyl methacrylate as well as acrylate PVA copolymers useful. Such copolymers will be particularly useful as blend components to improve overall desizing of size materials which are difficult to desize.

Sizing may be carried out using solutions of the PVA copolymer and PVA polymer blend having a total polymer concentration of from 1 to 20 weight percent, preferably from 4 to 12 weight percent. The sizing composition may incorporate other materials typically found in prior art sizing compositions. Such materials may include waxy-type lubricants, defoaming surfactants, and other surfactants. A skilled artisan will be able to judge what concentration size solution to use to achieve his desired size add-on level, and what additives are best suited to his operations.

Desizing of sized fabrics is commonly carried out using water washing at varying temperatures. Surprisingly, it has been found that with the high ester comonomer levels of the PVA copolymers of the present invention, desizing can be carried out effectively with caustic solutions, and those caustic solutions can be very dilute. PVA homopolymers, and many PVA copolymers with lower levels of comonomer than the high ester copolymers of this invention, desize either less rapidly, or require higher temperatures and/or higher caustic concentrations for the same amount of desizing. Caustic desizing solutions can be as dilute as about 0.001 weight percent, particularly if somewhat elevated temperatures are used to desize, though concentrations above 0.05 weight percent will more often be required. Generally, more rapid, lower temperature or more complete desizing is possible as the concentration is increased. However, in blends which contain partially hydrolysed PVA homopolymer, more dilute caustic solutions may be favored, as examples discussed below show. Generally, the caustic will have to be subsequently washed out, so that higher concentration caustic than is adequate should be avoided. The caustic desizing solutions should have, at the most, a concentration of 10 weight percent. Preferably however, they should be below 2 weight percent, and most preferably between 0.1 and 1.5 weight percent. For any particular PVA copolymer size or PVA polymer blend size, add-on level, fabric heat treatment, a suitable concentration for the desizing caustic solution and a suitable temperature for desizing can be readily determined when it has been decided how rapidly and how completely desizing is required. Thus the emphasis may be on the most rapid desizing for economic reasons. Or the emphasis may be on as low temperature desizing as possible because the material is somewhat temperature sensitive. Generally, almost complete desizing is required. There will not be just one caustic concentration and one temperature which is suitable, but a range of alternatives. Suitable caustic materials include any of the alkali metal hydroxides or carbonates, i.e. sodium, potassium or lithium, with sodium hydroxide being preferred. Carbonates have been found to desize the copolymers and copolymer blends of the invention much less efficiently, though more efficiently in general than water. In some mills however, conditions may necessitate milder desizing. When this is the case, carbonates can be used, and adjustments made in concentration and time and temperature of desizing.

It is important to recognize that, while sizes made from the high ester PVA copolymers alone or even the blend sizes of this invention, desize more rapidly and effectively in caustic than many PVA homopolymers or low comonomer PVA copolymers sizes materials or natural size materials such as starch, they may desize less effectively when normal (aqueous) desizing is employed. Thus, as previously noted, a 9 weight percent methyl acrylate copolymer could not be desized as effectively as an 88% partially hydrolysed homopolymer or a 5.5 weight percent methyl methacrylate copolymer at 22 deg. C. This can be a significant advantage, since materials which do not desize readily in water will be less water sensitive and, in general, may have less tendency to become sticky in moist environments. Of course, this does not mean that the blends of the invention can not be desized with water. However, longer times and or higher temperatures will be necessary than with cautic desizing.

The yarns which can advantageously employ the sizes of this invention are any conventional yarn, either from spun fiber or filament assemblages or other weavable structures, and may be hydrophilic such as cotton or hydrophobic such as nylon or polyester or from hydrophilic/hydrophobic combinations. Some finishing operations on (woven) textiles or even knitted fabrics can also advantageously employ the sizes of this invention.

The high ester PVA copolymer itself may have a 4% solution viscosity from 1 to 60 centipoise. Preferably it should have a viscosity between 3 and 25 centipoise. The skilled artisan will be able to determine the optimum polymer viscosity, polymer size concentration, and add-on level for the particular yarn, fabric and weaving conditions he is using.

The other PVA polymer in the blend may be any PVA homopolymer previously known for use as size or other PVA copolymers previously used for size but containing low levels (less than 7 weight percent) of comonomer. This includes both fully and partially hydrolysed homopolymer, and PVA copolymers with less than 7 weight percent comonomer selected from the group consisting of alkyl methacrylates, alkyl acrylates, dialkyl fumarates and dialkyl maleates, wherein the alkyl group contains from 1 to 8 carbon atoms. Partially hydrolysed PVA may be from 50 to 98% hydrolysed, but will preferably by above 80% hydrolysed.

The blend used to prepare the size solution may contain from 10 to 90 weight percent of the high ester PVA copolymer and from 90 to 10 weight percent of the other PVA polymer. Preferably, however, there should be at least about 30 percent of the high ester PVA copolymer in the polymer blend used for the size.

The blends of this invention are ideally suited for use in sizes. However, the blends may also be adaptable for uses in certain film applications. Such films can include agricultural mulch films, biodegradable packaging films and water soluble films. The blends may also be adaptable for use as hot melt adhesives, binders and the like.

EXAMPLES

The PVA polymers used in the various examples and comparative examples are listed in Table I. Size solutions were made from these polymers or blends of these polymers, having a concentration of 8 weight percent total polymer, by dissolving them in water at about 90 deg. C., mixing for about 2 hours. The size solutions were clear and slightly viscous. When blend sizes were tested, the blends contained 50 weight percent of each component. The sizes used are listed in Table II.

Sized fabric samples were prepared as follows. Approximately 2 inch by 2 inch squares of a 7 ounce, all cotton, bleached, duck fabric type 464 obtained from Test Fabrics Inc. were first weighed, then soaked in size solution for about 2 minutes at about 35 deg. C., mixing gently. The samples were then dried by placing on aluminum foil, treated with Teflon lubricant to prevent sticking, at 50 deg. C. in a convection oven for 17±1 hours. They were then cooled in a calcium sulfate desiccated box, and reweighed to determine the amount of size added on. In some cases the samples were heat-treated by placing in a convection oven at 140 deg. C. for 10 minutes.

Desizing tests were carried out by soaking the sized fabric sample in 100 grains of the test desizing medium, (either water or caustic) for 10 minutes with gentle mixing. In some instances when water was used, the sample was further desized by soaking in another 100 grams of water for 10 minutes. In all instances when caustic was used, the sample was subsequently soaked in 100 grams of water for 10 minutes. This subsequent water treatment washes out the caustic as well as providing for slight further desizing. The desized or partially desized samples were then dried in a convection air oven at 140 deg. C. for 1 hour and then allowed to cool in a calcium sulfate desiccated box. Details, are shown in the Tables IIIA and IIIB.

When examples of blend sizes of the invention are shown in the Tables, they are given a number without a prefix C. When examples of sizes outside the compositions of the invention are listed, whether from a single PVA polymer or from a blend which does not include the high ester PVA copolymer of the invention, they are labeled with a prefix C, indicating they are shown for comparison. The process of the invention includes a caustic desizing step. Examples which illustrate the process of the invention are shown with an asterisk (*).

While complete desizing is generally considered necessary, the percent desizing in the examples is considered to be an indication of the ease of complete desizing. If the value shown is less than 100%, then longer desizing times, different caustic concentration or somewhat higher temperatures would be necessary to achieve complete desizing. Examples C 12 and C 13 show that double washes (i.e. equivalent to longer desizing times) produced increased desizing, but the order of amount desized remains the same (compare C1 and C2).

Table IIIA shows the effect of desizing single PVA polymers or blends of the invention in water. In some examples the sized fabrics were heat treated, and some were subjected to a double water wash.

Examples C1 to C5 are for single PVA polymers. C2 is for high ester PVA copolymer. High ester copolymer does not desize particularly well in water—in fact not as well as partially hydrolysed PVA homopolymer (C5) or lower comonomer content methyl methacrylate copolymer (C4). Examples C7 to C11 parallel C1 to C5 but the sized fabric has been heat treated. All are seen to desize less readily after heat treatment. Examples 1 to 4 show that with water desizing, blending PVA polymers with the high ester PVA copolymer shows little or no improvement in ability to desize. Example 3 for instance which is a blend of high ester copolymer and partially hydrolysed homopolymer desizes less that C5 which is size of the same partially hydrolysed homopolymer by itself. Only at higher temperatures, (Example 2) does high desizing occur. These experiments emphasize that with water desizing, blending is no advantage. The advantage comes only when caustic desizing is used. The experiments also emphasize that water sensitivity also would not increase significantly in the blend examples shown.

Table IIIB shows similar samples subjected to caustic desizing, followed by a water wash. They demonstrate the complete difference in behavior between water desizing and caustic desizing. They also demonstrate how addition of high ester comonomer PVA copolymer to various other PVA polymers improves the overall rate of desizing. Yet as table IIIA demonstrated, water sensitivity is not increased in general, as shown by no little to no improvement in water desizing by use of blending with high ester PVA copolymer.

Examples C14 to C19 are for single PVA polymer sizes, including high ester comonomer PVA copolymer (C15) which can be seen to be completely desized by 1% caustic solution. Values above 100% are an artifact due to the fact that some of the fabric is lost in the process of desizing, even with water (see value over 100% in Table IIIA). For this reason, it is likely that all values are up to about 5% higher than the true level of desizing achieved. Examples C20 to C23 and C25 are for the same five single PVA polymer sizes as C14 to C19, except that the sized/fabrics were heat treated. It is seen that all desize to a lesser extent after heat treatment, except the high ester comonomer PVA copolymer (C21 ). Examples C19 and C24 are for blends outside the invention. The rest, with an asterisk use the blend polymers of the invention with the process step of caustic desizing. Comparison of Examples C14 for fully hydrolysed PVA homopolymer with 5* and 6* for blends of fully hydrolysed homopolymer and high ester comonomer PVA copolymer shows the tremendous increase in the amount desized. The difference between 5* and 6* is that 6* is a higher viscosity homopolymer (see Table I for H99-1 and H99-2). Higher viscosity leads to less ready desizing. The most dramatic improvement seen is with partially hydrolysed PVA homopolymer (alone in Examples C18 and C23, size I), and blended with high ester comonomer PVA copolymer (Examples 7*, 11*, 12* and 13*, size K, and 14* and 15* which use a higher viscosity partially hydrolysed PVA homopolymer H88-2, see Table I). Note that Example 12* shows that even very dilute caustic is effective in desizing. Examples 7* and 13* showy that KOH and NaOH give comparable desizing. Note the amazing decrease in amount of desizing from example 14 to 15 despite a large increase in caustic concentration. This demonstrates the phenomenon that partially hydrolysed PVA homopolymer is subject to further hydrolysis, causing the resin to approach fully hydrolysed PVA homopolymer which is much less readily desized by any desizing medium. It also shows that, in this case, best desizing medium is a more dilute caustic solution. In general, the strength of caustic most suitable will depend on the particular blend, and can be readily determined by a few experiments.

TABLE I

| | | PVA SAMPLES TESTED | |
| --- | --- | --- | --- |
| Code | Solution Viscosity | Mole Percent Hydrolysis | Composition Description |
| H88-1 | 21–26 | 87–89 | Partially hydrolysed 'homopolymer' |
| H88-2 | 44–50 | " | " |

TABLE I-continued

PVA SAMPLES TESTED

| Code | Solution Viscosity | Mole Percent Hydrolysis | Composition Description |
|---|---|---|---|
| H99-1 | 12–15 | 99.0–99.8 | 'Fully' hydrolysed homopolymer |
| H99-2 | 27–33 | " | " |
| C3M | 24–32 | 99.0–99.8 | Fully hydrolysed copolymer 3.3–4.3% MMA |
| C5M | 12–15 | 98.0–99.8 | Fully hydrolysed copolymer 5.0–6.0% MMA |
| C9A | 15–21 | 98.0–99.8 | Fully hydrolysed copolymer 8.5–10.5% MA |

Polymer code designations summarize the nature of the composition; H for Homopolymer, C for Copolymer 88 for ~88 mole % hydrolysed, M for methyl methacrylate comonomer, and A for methyl acrylate comonomer.
Solution Viscosity in Centipoise, measured on a 4 weight percent solution at 20 deg. C., determined by Hoeppler falling ball method, bond dry basis.
All samples have a solution pH between 5 and 7.
All samples have a maximum ash level of 0.7 weight percent calculated as sodium oxide, dry basis.
Comonomer level in copolymer is weight percent, calculated as non-lactonized comonomer unit in the poly(vinyl alcohol) chain.
Comonomer abbreviations: MMA = methyl methacrylate
MA = methyl acrylate

TABLE II

COMPOSITION OF SIZES TESTED

| SIZE | COMPOSITION |
|---|---|
| A | 8% solution of H99-1 |
| B | 8% solution of C9A |
| C | 8% solution of C3M |
| D | 8% solution of 50/50 H99-1/C3M |
| E* | 8% solution of 50/50 H99-1/C9A |
| F* | 8% solution of 50/50 C3M/C9A |
| G | 8% solution of C5M |
| H* | 8% solution of 50/50 C5M/C9A |
| I | 8% solution of H88-1 |
| J | 8% solution of 50/50 C5M/H88-1 |
| K* | 8% solution of 50/50 H88-1/C9A |
| L* | 8% solution of 50/50 H99-2/C9A |
| M* | 8% solution of 50/50 H88-2/C9A |

*Sizes used in Examples of Invention. Other sizes are for comparative purposes

TABLE IIIA

WATER DESIZING TESTS

| Ex.# | Size | Heat Treatment Yes(Y)No(N) | Size Weight (grams) | Desize Solution | Desize Temperature deg. C. | Percent Size Removed |
|---|---|---|---|---|---|---|
| C1 | A | N | .182 | Water | 22 | 27.5 |
| C2 | B | N | .207 | Water | 23 | 36.6 |
| C3 | C | N | .223 | Water | 22 | 29.7 |
| C4 | G | N | .171 | Water | 22 | 51.9 |
| C5 | I | N | .260 | Water | 22 | 65.5 |
| C6 | D | N | .213 | Water | 22 | 27.0 |
| 1 | E | N | .203 | Water | 22 | 43.4 |
| 2 | E | N | .151 | Water | 80 | 114.0 |
| 3 | K | N | .235 | Water | 22 | 60.6 |
| C7 | A | Y | .173 | Water | 22 | 17.3 |
| C8 | B | Y | .223 | Water | 23 | 23.5 |
| C9 | C | Y | .217 | Water | 22 | 15.6 |
| C10 | G | Y | .203 | Water | 22 | 31.3 |
| C11 | I | Y | .245 | Water | 23 | 58.3 |
| 4 | E | Y | .151 | Water | 22 | 25.0 |
| C12 | A | N | .164 | Water/Water | 22 | 34.6 |
| C13 | B | N | .272 | Water/Water | 22 | 53.1 |

TABLE IIIB

CAUSTIC DESIZING TESTS

| Ex.# | Size | Heat Treatment Yes(Y)No(N) | Size Weight (grams) | Desize Solution | Desize Temperature deg. C. | Percent Size Removed |
|---|---|---|---|---|---|---|
| C14 | A | N | .182 | 1% NaOH/Water | 22 | 35.6 |
| C15 | B | N | .324 | 1% NaOH/Water | 22 | 105.9 |
| C16 | C | N | .230 | 1% NaOH/Water | 22 | 57.7 |
| C17 | G | N | .144 | 1% NaOH/Water | 22 | 92.5 |
| C18 | I | N | .255 | 1% NaOH/Water | 22 | 55.4 |
| C19 | J | N | .207 | 1% NaOH/Water | 22 | 71.3 |
| 5* | E | N | .176 | 1% NaOH/Water | 22 | 79.6 |
| 6* | L | N | .212 | 1% NaOH/Water | 22 | 62.1 |
| 7* | K | N | .181 | 1% NaOH/Water | 22 | 97.6 |
| 8* | M | N | .236 | 1% NaOH/Water | 22 | 85.4 |
| C20 | A | Y | .143 | 1% NaOH/Water | 22 | 19.1 |
| C21 | B | Y | .249 | 1% NaOH/Water | 22 | 107.3 |
| C22 | G | Y | .177 | 1% NaOH/Water | 22 | 67 |
| C23 | I | Y | .266 | 1% NaOH/Water | 22 | 48.7 |
| 9* | E | Y | .180 | 1% NaOH/Water | 22 | 63.1 |
| 10* | H | Y | .189 | 1% NaOH/Water | 22 | 93.9 |
| C24 | J | Y | .243 | 1% NaOH/Water | 22 | 50.6 |
| C25 | C | Y | .192 | 1% NaOH/Water | 22 | 31.1 |
| 11* | K | Y | .241 | 1% NaOH/Water | 22 | 90.0 |
| 12* | K | N | .222 | 0.1% NaOH/Water | 22 | 96.0 |
| 13* | K | N | .197 | 1% KOH/Water | 22 | 96.6 |
| 14* | M | N | .206 | 0.1% KOH/Water | 22 | 94.8 |
| 15* | M | N | .223 | 2.5% NaOH/Water | 22 | 78.9 |
| 16* | F | Y | .221 | 1% NaOH/Water | 22 | 57.8 |

Notes for TABLE IIIA and IIIB.
Fabric samples were approximately 0.5 grams, varying from about 0.45 to 0.65 grams.
Desizing liquid is either water or the caustic solution indicated. Percent is weight percent. NaOH and KOH are sodium and potassium hydroxide. Where two desizing liquids are shown, desizing was carried out in two liquids consecutively, e.g., caustic then water.

We claim:

1. An improved process for producing woven textiles, comprising:
   a) sizing yarn to be woven with an aqueous solution of a blend of poly(vinyl alcohol) polymers, which comprises:
      a) from 10 to 90 parts of a first poly(vinyl alcohol) polymer which is a poly(vinyl alcohol) copolymer containing from about 7 to 15 weight percent units derived from an alkyl acrylate or methacrylate or a dialkyl fumarate or maleate, wherein the alkyl groups contain from 1 to 8 carbon atoms, and
      b) from 90 to 10 parts of a second poly(vinyl alcohol) polymer which is a poly(vinyl alcohol) homopolymer, or a poly(vinyl alcohol) copolymer containing less than 7 weight percent units derived from an alkyl acrylate or methacrylate or dialkyl fumarate or maleate, wherein the alkyl groups contain from 1 to 8 carbon atoms, or blends of such second poly(vinyl alcohol) polymers;
   b) weaving the yarn to produce woven textile material;
   c) desizing the woven textile material with an aqueous caustic solution having a concentration between 0.001 and 10 weight percent caustic material in water, and
   d) optionally washing the caustic desized woven textile material with water.

2. The process of claim 1, wherein the first poly(vinyl alcohol) polymer is a copolymer containing 7 to 15 weight percent methyl acrylate, and the caustic desizing material is sodium hydroxide.

3. The process of claim 1, wherein the caustic solution has a concentration between 0.1 and 1.5 weight percent.

4. The process of claim 2 wherein the caustic solution has a concentration between 0.1 and 1.5 weight percent.

* * * * *